(12) United States Patent
Muccifora et al.

(10) Patent No.: US 12,556,976 B2
(45) Date of Patent: Feb. 17, 2026

(54) SPATIALLY-INDEXED CHANNEL MANAGEMENT OPERATIONS

(71) Applicant: Cisco Technology, Inc., San Jose, CA (US)

(72) Inventors: Roberto Muccifora, Ropraz (CH); Domenico Ficara, Essertines-sur-Yverdon (CH); Amine Choukir, Ecublens (CH); Vishal S. Desai, San Jose, CA (US); Shailender Potharaju, Fremont, CA (US); Mathieu B. Monney, Bussigny (CH)

(73) Assignee: Cisco Technology, Inc., San Jose, CA (US)

( * ) Notice: Subject to any disclaimer, the term of this patent is extended or adjusted under 35 U.S.C. 154(b) by 371 days.

(21) Appl. No.: 18/295,658

(22) Filed: Apr. 4, 2023

(65) Prior Publication Data

US 2024/0340705 A1 Oct. 10, 2024

(51) Int. Cl.
*H04W 28/18* (2009.01)
*H04W 16/18* (2009.01)
*H04W 72/53* (2023.01)

(52) U.S. Cl.
CPC ........... *H04W 28/18* (2013.01); *H04W 16/18* (2013.01); *H04W 72/53* (2023.01)

(58) Field of Classification Search
CPC ..... H04W 28/18; H04W 16/00; H04W 16/14; H04W 16/18; H04W 72/53; H04W 64/00; H04W 64/03; H04W 84/12; H04L 41/08
See application file for complete search history.

(56) References Cited

U.S. PATENT DOCUMENTS

| | | |
|---|---|---|
| 11,082,862 B1 | 8/2021 | Thakur et al. |
| 2005/0137994 A1 | 6/2005 | Fortin et al. |
| 2014/0274184 A1* | 9/2014 | Regan ................... H04W 24/02 455/515 |
| 2015/0373554 A1* | 12/2015 | Freda .................... H04W 16/14 455/450 |
| 2016/0088484 A1* | 3/2016 | Yang ..................... H04W 24/08 370/252 |
| 2016/0119793 A1 | 4/2016 | Tudose et al. |
| 2018/0041916 A1 | 2/2018 | Henderson et al. |
| 2018/0132112 A1* | 5/2018 | Khoshnevisan ...... H04W 16/14 |
| 2020/0359229 A1* | 11/2020 | Macmullan ........... H04W 24/02 |
| 2022/0256547 A1 | 8/2022 | Macmullan et al. |
| 2022/0329979 A1 | 10/2022 | Ansley et al. |
| 2024/0098615 A1* | 3/2024 | Anantharaman ..... H04W 40/10 |

* cited by examiner

*Primary Examiner* — Mohamed A Kamara
(74) *Attorney, Agent, or Firm* — Patterson + Sheridan, LLP

(57) ABSTRACT

Techniques for improved wireless configuration are provided. One or more enclosing polygons of a deployment of access points (APs) are determined, and a first query for a regulatory database is generated based on the one or more enclosing polygons, where the regulatory database is spatially-indexed. In response to the first query, a set of spatial regions is received, where each spatial region in the set of spatial regions is associated with a corresponding set of wireless parameters. A first set of wireless parameters is determined, for at least a first AP in the deployment of APs, based on the set of spatial regions. The first AP is configured based on the first set of wireless parameters.

20 Claims, 8 Drawing Sheets

SPATIALLY-INDEXED CHANNEL MANAGEMENT OPERATIONS

TECHNICAL FIELD

Embodiments presented in this disclosure generally relate to wireless deployment management. More specifically, embodiments disclosed herein relate to spatially-indexed wireless configuration techniques.

BACKGROUND

A variety of wireless systems use or rely on coordination between systems (or at least of awareness of other systems) to mitigate or avoid interference. Such cooperation may be particularly important when different wireless systems use overlapping spectrum. For example, incumbent networks (e.g., licensed cellular networks) may use frequencies that overlap with WiFi access points (APs) using the 6 GHz band. Automated frequency coordination (AFC) is one approach used to mitigate or prevent interference between such systems. Generally, AFC involves reliance on a database of registered spectrum use (e.g., the bands used in a given area), where other systems (e.g., wireless local area network (WLAN) APs) consult the database to determine whether its operations may interfere with preexisting use (e.g., with cellular networks).

Conventionally, AFC computation queries are performed on a per-AP basis. That is, each AP generally queries the AFC system independently in order to evaluate its own use. This is expensive and inefficient computationally and in terms of consumed bandwidth.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
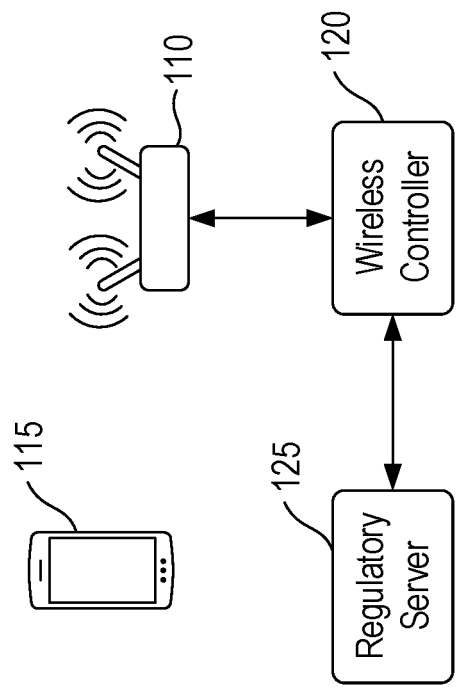
FIG. 1 depicts an example environment for frequency coordination, according to some embodiments of the present disclosure.
Figure 1:
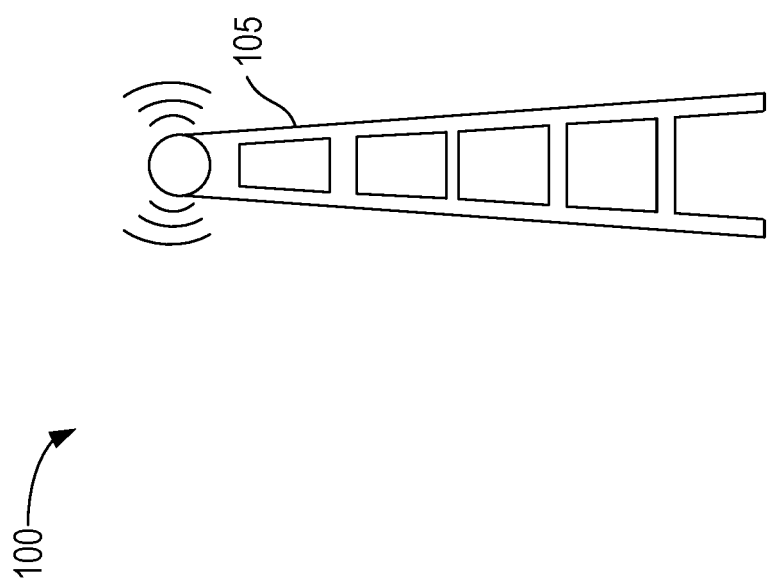

One embodiment presented in this disclosure provides a method, including determining one or more enclosing polygons of a deployment of APs; generating, by a wireless controller, a first query for a regulatory database based on the one or more enclosing polygons, wherein the regulatory database is spatially-indexed; receiving, in response to the first query, a set of spatial regions, wherein each spatial region in the set of spatial regions is associated with a corresponding set of wireless parameters; determining, for at least a first AP in the deployment of APs, a first set of wireless parameters based on the set of spatial regions; and configuring the first AP based on the first set of wireless parameters.

Other embodiments in this disclosure provide non-transitory computer-readable mediums containing computer program code that, when executed by operation of one or more computer processors, performs operations in accordance with one or more of the above methods, as well as systems comprising one or more computer processors and one or more memories containing one or more programs which, when executed by the one or more computer processors, performs an operation in accordance with one or more of the above methods.

EXAMPLE EMBODIMENTS

Embodiments of the present disclosure provide methods, systems, and techniques for improved frequency coordination via spatially-indexed databases.

Some approaches to frequency coordination, such as AFC, require wireless deployments (e.g., APs) operating in certain bands (e.g., the 6 GHz band) to periodically query a central registry to determine the allowable wireless parameters for the deployment (e.g., allowable channels and/or transmission powers). In some conventional approaches, each AP must query the registry periodically (e.g., every twenty-four hours), regardless of whether the AP has moved, as well as regardless of the number and arrangement of APs in the deployment. Such individual queries are wasteful and often redundant, as APs are often co-located (e.g., relatively close together) in a given deployment, and are therefore likely to be subject to the same incumbent usage of the radio frequency. It is therefore wasteful to query for channel and power availability on a per-AP basis. Moreover, the regulatory database changes infrequently, making it wasteful to require such frequent queries for each AP.

In some embodiments of the present disclosure, a wireless deployment can be described spatially (e.g., using enclosing or bounding polygons for the physical area covered by the deployment), and a spatial query can be used to query the regulatory database (e.g., based on the polygon(s)) with respect to the entire deployment. In some embodiments, the regulatory database can be spatially indexed, allowing for efficient querying for the entire deployment rather than independently for each AP. Furthermore, in some aspects, a spatial registration of the deployment can be used to enable efficient change-based notifications based on regulatory database changes. That is, rather than re-querying periodically (e.g., daily), the deployment may register its polygon(s) with the regulatory system, asking to be updated whenever changes to the database implicate the deployment. This can substantially improve the efficiency of the frequency coordination systems.

In some embodiments, one or more components that control or manage the deployment may generate or find the enclosing polygon(s) of the coverage of the deployment. Generally, the enclosing polygon(s) can include a single polygon (e.g., a convex hull) or set of polygons (e.g., a set of bounding rectangles, circles, or other shapes) enclosing the coverage area of the wireless deployment. Additionally, the enclosing polygon(s) can generally include two-dimensional polygons (e.g., where height or altitude is irrelevant) or three-dimensional polygons (e.g., where the height or altitude of the APs is relevant to the frequency coordination). For example, a wireless controller for the deployment may generate or determine the enclosing polygon(s) based on the position of each AP in the deployment and/or the coverage area of each such AP.

The enclosing polygon(s) can then be provided as the input query to a regulatory database that is spatially-indexed. In some embodiments, the regulatory database includes a set of records indicating restricted and/or allowable wireless parameters based on physical location, based on registered incumbent/licensed use of the spectrum in the location. In an embodiment, the regulatory system can then use the spatial query to find or identify any spatial region(s) registered in the regulatory database as having a physical or spatial area that corresponds to or overlaps with all or a portion of the enclosing polygons specified in the query. Generally, each registered spatial region may have an associated set of allowable or restricted wireless parameters (e.g., channels and/or powers) indicating the parameter(s) that any AP in the registered spatial can use for wireless communication.

In some embodiments, this set of spatial regions is returned to the requesting entity (e.g., the wireless controller). In an embodiment, the wireless controller can then query a deployment database based on the set of spatial regions. That is, the deployment database may be a spatially indexed store of APs in the deployment and their locations (e.g., in two dimensional or three dimensional space). For each spatial region (in the set returned by the regulatory system), therefore, the wireless controller may identify any AP(s) included in the region efficiently by querying the deployment database based on the specified spatial region/polygon. This allows the wireless controller to efficiently identify any APs, in the deployment, that are subject to the corresponding parameter restrictions indicated for the given spatial region.

In this way, the wireless controller can rapidly configure each AP in the deployment based on the applicable wireless parameters, as indicated for the spatial region(s) returned by the regulatory system. In some embodiments, the determined allowable wireless parameters for the deployment are used to configure the APs using channel/power selection algorithms, such as Cisco's Radio Resource Management (RRM) system.

In some embodiments, the enclosing polygon(s) used to describe the deployment can also be used for long term notification based on regulatory system updates. For example, the wireless controller may ask that the provided polygon(s) be registered with the regulatory system. When any changes to the regulatory database occur (e.g., the addition or removal of registered uses, changes to the allowable wireless parameters for one or more regions, and the like), the regulatory database can efficiently use the spatially indexed database to identify any affected deployments (e.g., deployments having enclosing polygons that partially or entirely overlap with the updated registry information), and can provide updated spatial regions/wireless parameters to these affected deployments. This can substantially reduce the bandwidth and computational expense of conventional systems relying on periodic (e.g., daily) queries from each AP (particularly for situations where the regulatory database changes relatively infrequently).

FIG. 1 depicts an example environment 100 for frequency coordination, according to some embodiments of the present disclosure. In the illustrated example, a first wireless system is represented/supported by a base station 105, while a second wireless system is represented/supported by an AP 110. For example, the base station 105 may correspond to a base station used in cellular networks, such as a Node B, an Evolved Node B (eNB), and/or a Next Generation Node B (gNB). Generally, the base station 105 can represent any wireless system that uses one or more portions of a radio frequency (RF) spectrum. In some embodiments, the use of the wireless spectrum by the base station 105 may be referred to as "licensed" use to indicate that a regulatory entity (e.g., the Federal Communications Commission (FCC)) has granted permission (e.g., a license) for the base station 105 to use one or more wireless resources (e.g., portions of the spectrum). In some embodiments, the base station 105 may similarly be referred to as the incumbent user of the spectrum.

The AP 110 is generally representative of a wireless local area network (WLAN), such as a WiFi system, which also uses one or more portions of the RF spectrum. For example, the AP 110 may provide wireless communication and connectivity for nearby devices. In the illustrated embodiment, at least a portion of the spectrum used by the AP 110 overlaps with at least a portion of the spectrum used by the base station 105. For example, both the base station 105 and AP 110 may operate at least partially in a 6 GHz band. In some aspects, the wireless spectrum use by the AP 110 may be referred to as "unlicensed" use to indicate that no regulatory entity has granted exclusive permission for the AP 110 to use the one or more wireless resources (e.g., portions of the spectrum).

Although a single base station 105 and AP 110 are depicted for conceptual clarity, in embodiments, there may be any number and variety of base stations 105 and APs 110. For example, in a given geographic area, there may be multiple base stations 105 serving one or more cellular networks. Similarly, there may be one or more APs 110 corresponding to one or more deployments/WLANs.

The depicted environment 100 further includes a client device 115. Though a single client device 115 is depicted for conceptual clarity, there may be any number and variety of client devices 115. Generally, the client device 115 may be communicatively coupled with the base station 105, AP 110, or both. For example, the client device 115 may be a smartphone capable of communicating with the base station 105 (e.g., via a cellular network) as well as with the AP 110 (e.g., via a WiFi network).

As discussed above, if the base station(s) 105 and AP(s) 110 communicate using overlapping wireless spectrum, there may be interference between them. That is, devices (such as the base stations 105 and APs 110 themselves, as well as any client devices 115) may experience interference between the distinct networks, which can have a significant negative impact on the device and network stability, throughput, and efficiency. In the illustrated embodiment, therefore, one or both of the networks can use frequency coordination (e.g., AFC) to reduce or eliminate this contention.

Specifically, in the illustrated example, the AP 110 is controlled or managed at least partially by a wireless controller 120, which interfaces with a regulatory server 125. Although the illustrated example depicts a discrete wireless controller 120, the management operations of the wireless controller 120 may be implemented by any device or system, and may be combined or distributed across any number of systems. For example, in some aspects, the wireless controller 120 is a WLAN controller (WLC) for a deployment of APs 110. In some embodiments, the wireless controller 120 is implemented on the AP 110 itself. Further, in at least some embodiments, the wireless controller 120 corresponds to a broker, mediator, or representative system that assists in the management of multiple deployments. The wireless controller 120 may generally be implemented using hardware, software, or a combination of hardware and software. In at least some embodiments (such as when the wireless controller 120 acts as a broker for multiple deployments), the wireless controller 120 can be implemented as a cloud-based service.

Generally, the wireless controller 120 generates or determines an enclosing polygon for the AP(s) 110, and transmits this polygon as a spatial query to the regulatory server 125 (which may be an AFC server). For example, if the wireless controller 120 corresponds to or represents a deployment of APs 110 (e.g., the wireless controller 120 directly manages the APs 110), the wireless controller 120 may generate the spatial query based on its own knowledge of the deployment (e.g., the physical arrangement of APs 110). In some embodiments, if the wireless controller 120 corresponds to or represents a collection of deployments (e.g., an overall controller for a shared building, where each tenant in the building has its own controller for its own deployment of APs), the controller of each such deployment may provide its enclosing polygon(s) to the wireless controller 120 acting as a broker for the physical area. The wireless controller 120 can then aggregate these polygons for each deployment to generate an overall query for the building (or other physical space).

In the illustrated example, the regulatory server 125 can use the provided polygon(s) to query a spatially indexed regulatory database indicating wireless restrictions and/or incumbent wireless use based on physical location. For example, the regulatory database may include spatially-indexed records of incumbent wireless networks in various regions. As discussed above, the regulatory server 125 may thereby generate a set of spatial regions (e.g., polygons), where each region corresponds to a physical space or area and has a corresponding set of wireless restrictions (also referred to as allowable wireless parameters) based on this registered/licensed use. This set of regions can then be returned to the wireless controller 120.

In the illustrated example, the wireless controller 120 can then use these regions to drive appropriate configuration of the AP(s) 110. For example, if the wireless controller 120 acts as a broker or representative for multiple deployments, the wireless controller 120 can return, to each respective deployment controller, the corresponding spatial region(s) that overlap with the respective deployment. Each deployment controller can then use the region(s) to identify applicable wireless restrictions for its APs 110.

As illustrated, if the wireless controller 120 is a WLAN controller for a deployment of APs 110, the wireless controller 120 can similarly identify applicable wireless parameters for each AP 110 based on a deployment database. In some embodiments, the deployment database is a spatially indexed database of the locations of one or more APs 110, such that the wireless controller 120 can query the database using the set of spatial regions to efficiently identify, for each region, any AP(s) 110 that are physically within the region (or that have a coverage area overlapping with the region).

In this way, the wireless controller 120 can then configure each AP 110 based on the wireless parameter(s) indicated by the regulatory server 125, such that the APs 110 can operate without interfering with the operations of the base station 105 (or other incumbents).

In some embodiments, as discussed in more detail below, the wireless controller 120 may optionally register the deployment polygon(s) with the regulatory server 125. When the regulatory server 125 determines that the regulatory database has been changed, it can efficiently identify affected deployments based on these registered polygons, and transmit updated set(s) of region(s) to each affected deployment. This can substantially reduce the bandwidth across the network (e.g., between the wireless controller 120 and the regulatory server 125), as well as reducing computational expense on the wireless controller 120 and the regulatory server 125. For example, because the wireless controller 120 need not formulate new queries periodically (e.g., daily), it need not waste computational resources generating such queries, and need not waste network resources transmitting such queries. Similarly, the regulatory server 125 need not receive and evaluate/respond to such queries frequently, and need not waste network resources transmitting responses. This may be particularly efficient in many common systems where regulatory changes are relatively infrequent.

Figure 2:
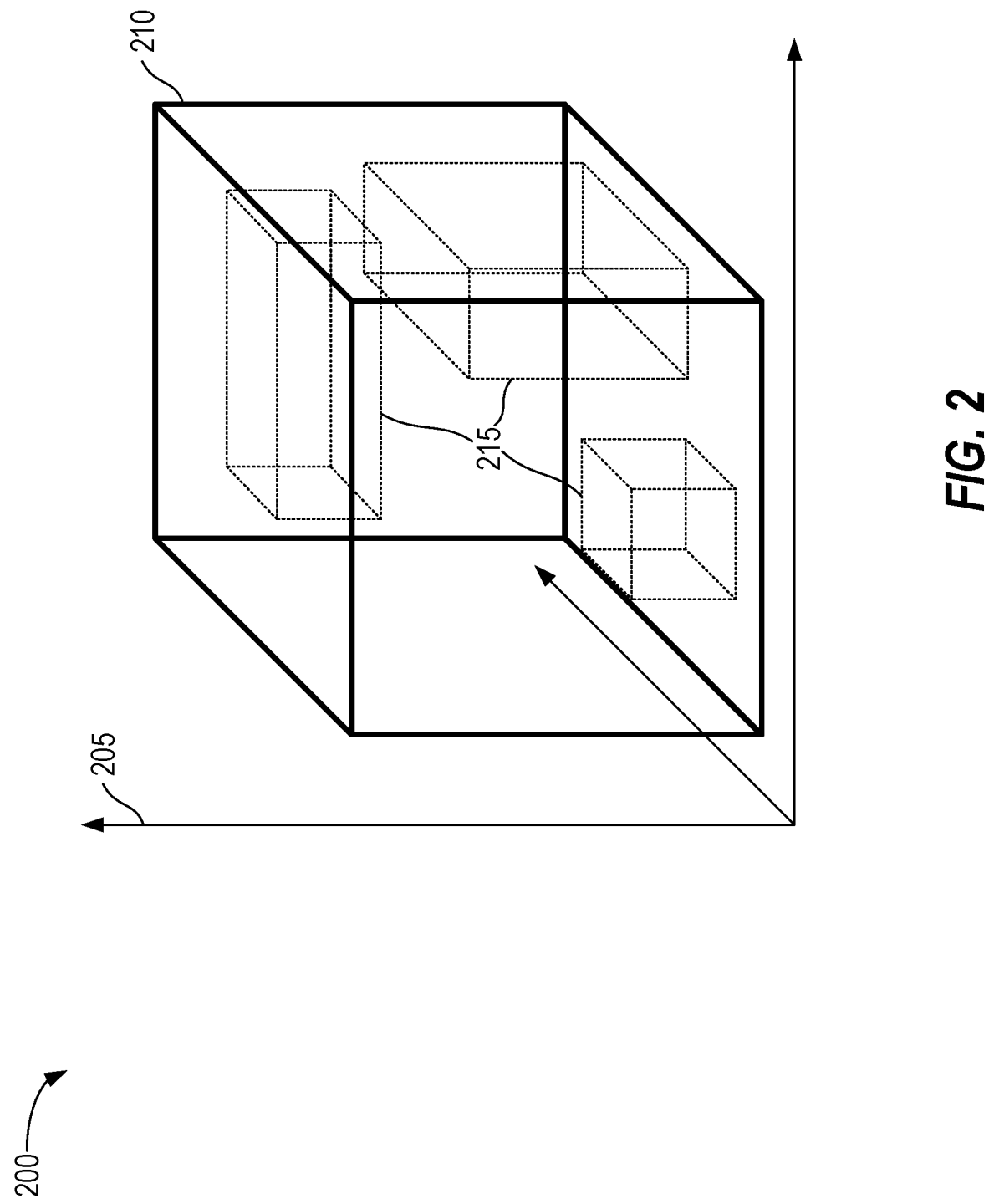
FIG. 2 depicts an example visualization of spatial queries and responses to improve frequency coordination, according to some embodiments of the present disclosure.

FIG. 2 depicts an example visualization 200 of spatial queries and responses to improve frequency coordination, according to some embodiments of the present disclosure.

In the illustrated example, a rectangular polygons are depicted on a three-dimensional graph 205. Although rectangular polygons are depicted for conceptual clarity, in embodiments, the particular shape of each polygon may differ depending on the particular implementation. Further, although a three-dimensional graph 205 is depicted, in embodiments, the dimensionality of the polygons/queries may differ depending on the particular implementation. As illustrated, the polygon 210 represents an enclosing polygon for a wireless deployment (e.g., within a building). As discussed above, the enclosing polygon 210 may be generated or determined by a controller, such as the wireless controller 120 of FIG. 1. For example, the controller may be a WLAN controller for a deployment of APs, may be a broker or representative for a set of deployments, and the like. As discussed above, the enclosing polygon 210 generally reflects the physical location(s) of the AP(s) and/or the physical coverage area of the AP(s).

As discussed above, this enclosing polygon 210 can be used to provide a spatial query to a spatially indexed database (e.g., by a regulatory server). As illustrated, the coverage area of the deployment (represented by enclosing polygon 210) overlaps with a number of registered uses/available wireless parameters, as depicted by polygons 215. Specifically, when the regulatory server queries the regulatory database, the polygons 215 may be returned as a set of spatial regions, overlapping with the polygon 210, where each spatial region (represented by a corresponding polygon 215) has a corresponding set of allowable/available wireless parameters. Generally, the wireless parameters may be specified affirmatively (e.g., indicating which parameters are available or allowable) and/or negatively (e.g., indicating which parameters are not available or not allowable) for each region.

As discussed above, these polygons 215 are then returned to the requesting controller, which can then use these polygons 215 to query a deployment database. This allows the controller to efficiently identify, for each spatial region (represented by a corresponding polygon 215), the set of zero or more AP(s) that are contained within the polygon 215 and/or have a coverage area that overlaps with the polygon 215. These APs can then be efficiently reconfigured based on the indicated wireless parameters provided by the regulatory server, as discussed above.

Figure 3:
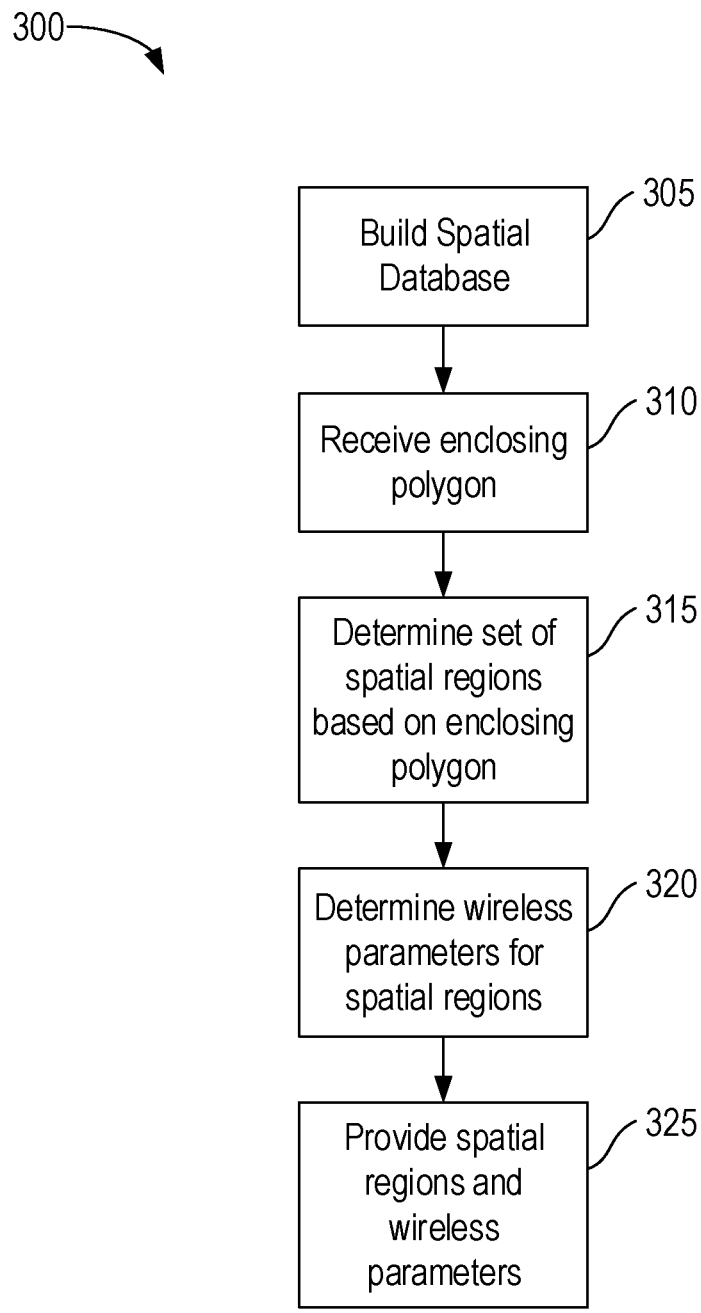
FIG. 3 is a flow diagram depicting an example method for building and using spatially indexed regulatory databases to improve frequency coordination, according to some embodiments of the present disclosure.

FIG. 3 is a flow diagram depicting an example method 300 for building and using spatially indexed regulatory databases to improve frequency coordination, according to some embodiments of the present disclosure. In some aspects, the method 300 is performed by a regulatory system, such as the regulatory server 125 of FIG. 1.

At block 305, the regulatory system builds or generates a spatial regulatory database indicating wireless restrictions based on physical area, as discussed above. Generally, the spatial database can be generated based on defined regulatory or wireless restrictions, such as spectrum licenses granted by a regulatory body (e.g., the FCC). For example, the database may include records of incumbent (e.g., licensed) use of the wireless spectrum, spatially-indexed based on the location of such use. In this way, the database can include or indicate spatial regions, where each spatial region is associated with a corresponding set of restrictions or allowable wireless parameters. Generally, the spatial database can include any spatially-indexed storage architecture that enables spatial access methods (e.g., searching based on spatial definitions rather than a numeric value or other key). The regulatory system may construct the spatial database using any suitable architecture, such as R-trees.

In some aspects, the spatial database is constructed based on a preexisting regulatory database (e.g., an AFC database). That is, an existing regulatory database may be converted or used to generate the spatially-indexed database. In some aspects, the spatial database is constructed directly from the licenses or restrictions (e.g., without first creating a conventional regulatory database). Although the illustrated example depicts the regulatory system building the spatial database, in some aspects, one or more other entities may generate the spatial regulatory database, and the regulatory system may simply use the spatial database during runtime.

At block 310, the regulatory system receives an enclosing polygon describing the physical arrangement of APs in one or more wireless deployments. The enclosing polygon may generally be provided to the regulatory system as part of a query (e.g., an AFC query) to determine allowable wireless parameters. For example, as discussed above, the enclosing polygon may be provided by a wireless controller (such as the wireless controller 120 of FIG. 1) that controls or manages a deployment of APs. In some embodiments, the enclosing polygon is received from a broker or representative that represents multiple deployments/controllers, as discussed above. The enclosing polygon generally indicates the multidimensional coverage area (e.g., in 2D or 3D space) of the wireless deployment(s) based on the location of each AP (in 2D or 3D space) and/or the range or coverage of each AP, as discussed above.

At block 315, the regulatory system determines a set of spatial regions based on the enclosing polygon. For example, as discussed above, the regulatory system may query the spatial regulatory database to identify any defined/restricted regions that overlap partially or entirely with the enclosing polygon. As discussed above, each such region generally corresponds to licensed or otherwise approved or incumbent use (e.g., first priority use) of all or a portion of the RF spectrum in the indicated region, where other users of the spectrum in the region are considered secondary to and/or defer to the licensed/approved use.

At block 320, the regulatory system determines, for each spatial region in the set of spatial regions, a set of wireless parameters indicated in the spatial regulatory database. This may include, for example, where the parameters are themselves indicated in the database, and/or where the spatial database indicates where the parameters can be found (e.g., an address or pointer). In some embodiments, determining the wireless parameters includes determining the parameters used by the incumbent/approved entity (e.g., the channels, transmission levels, and the like that the approved entity uses). In some embodiments, determining the parameters includes determining allowable parameters (e.g., the channels, transmission levels, and the like that are not used by the incumbent). In at least one embodiment, the wireless parameters include a set one or more of allowable portions of the RF spectrum (e.g., frequencies, channels subcarriers, and the like), as well as one or more maximum transmission power levels (e.g., on a per-frequency or per-channel basis, or for the overall spectrum).

At block 325, the regulatory system provides the determined spatial regions and wireless parameters to the requesting entity. For example, as discussed above, the regulatory system may transmit the regions and corresponding parameters to the wireless controller or other system that transmitted the spatial query with the enclosing polygon.

In this way, the regulatory system can provide efficient wireless spectrum management using a spatial regulatory database and coverage polygon-based restriction lookup.

Figure 4:
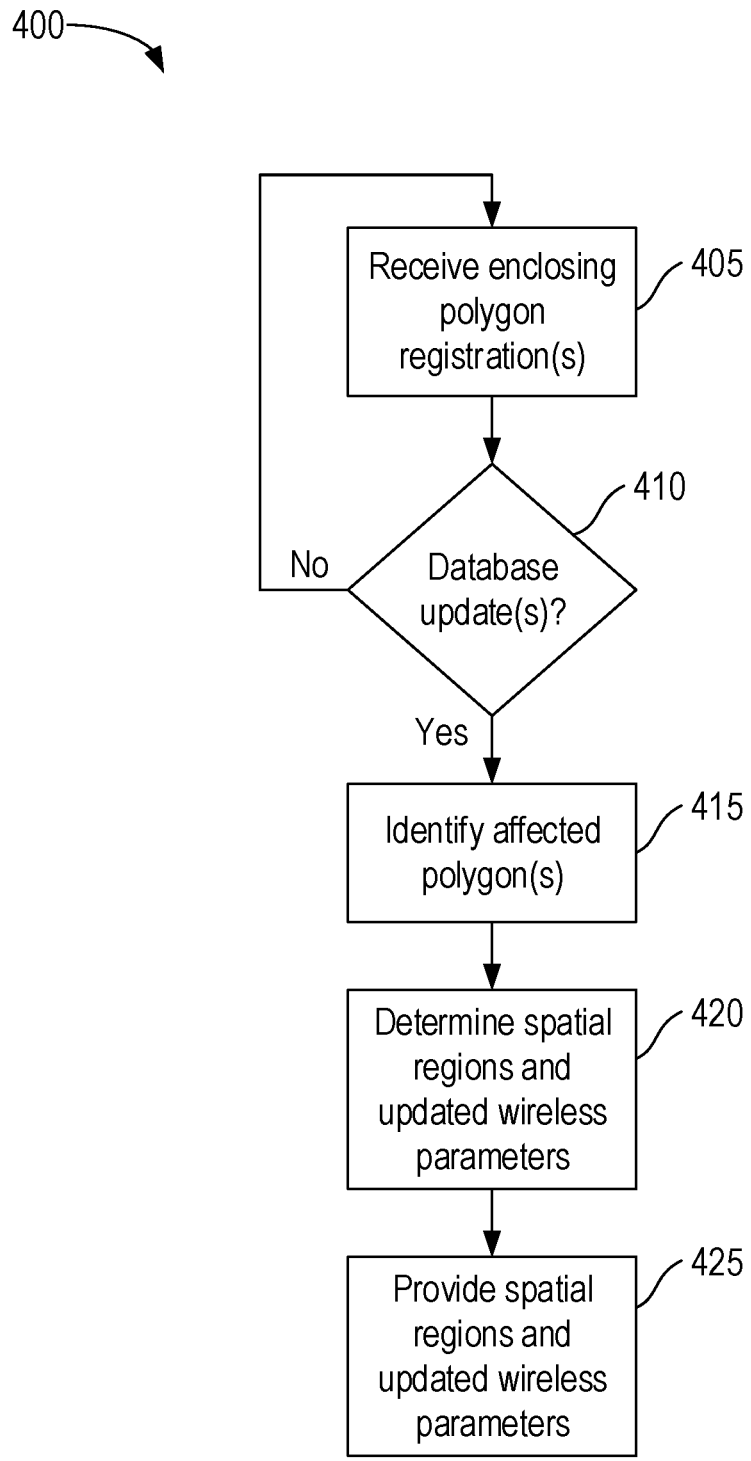
FIG. 4 is a flow diagram depicting an example method for polygon registration to improve frequency coordination, according to some embodiments of the present disclosure.

FIG. 4 is a flow diagram depicting an example method 400 for polygon registration to improve frequency coordination, according to some embodiments of the present disclosure. In some aspects, the method 400 is performed by a regulatory system, such as the regulatory server 125 of FIG. 1.

At block 405, the regulatory system can receive/store polygon registrations. For example, based on requests from other systems (e.g., wireless controllers), the regulatory system may register or store the provided enclosing polygon in a registry, along with other relevant information such as the identity of the corresponding controller. In some embodiments, controllers can include registration requests along with regulatory queries. For example, when a wireless controller provides an enclosing polygon as part of a query to determine wireless restrictions for a WLAN deployment, the controller may further include a flag or request that, along with retrieving the current restrictions, the regulatory system additionally registers the polygon for automated updates. In some embodiments, the polygon registrations may additionally or alternatively be provided independently from restriction queries. In some embodiments, the polygon registrations are stored in a spatially-indexed database such that they can be readily identified using spatial queries (in a similar manner to the spatial regulatory database).

At block 410, the regulatory system determines whether there have been any updates or changes to the (spatial) regulatory database. In many conventional systems, such regulatory changes are relatively infrequent. Generally, the changes can include, for example, addition of new incumbent/primary tenants or users of the spectrum (e.g., newly granted wireless licenses), removal of one or more incumbent users (e.g., revocation of a license and/or termination of operations by the tenant), modifications to spectrum use (e.g., new spectrum portions that are being used by the incumbent(s), new spectrum portions that are no longer used by the incumbent(s), changes in allowable transmission power, and the like), and the like.

If no updates have been made, the method 400 returns to block 405 to continue receiving enclosing polygon registrations (and, in some embodiments, responding to polygon queries). If the regulatory system determines, at block 410, that one or more database updates have occurred, the method 400 continues to block 415.

At block 415, the regulatory system identifies any deployments affected by the database change(s) based on the registered enclosing polygon(s). For example, the regulatory system may identify the spatial region(s) in the regulatory database that have been updated (e.g., added, removed, or modified). The regulatory system can then search the registration information (e.g., a spatially indexed registration database) using these updated spatial regions to identify any enclosing polygons that overlap partially or entirely with the updated spatial region(s).

At block 420, the regulatory system determines, for each affected polygon/deployment, a corresponding updated set of spatial regions and updated wireless parameters. For example, as discussed above with reference to blocks 315 and 320 of FIG. 3, the regulatory system may search the regulatory database based on the enclosing polygon to identify relevant regions, and return these regions and parameters (e.g., potentially including regions/parameters that have not changed, along with the regions/parameters that have been updated).

In some embodiments, the regulatory system may additionally or alternatively determine only the updated regions/parameters. For example, after identifying an affected enclosing/deployment polygon at block 415 (e.g., based on an updated spatial region), the regulatory system may then determine the updated spatial region (which was used to identify the affected polygon) and/or wireless parameters for the corresponding controller. That is, the regulatory system may determine and/or provide only the modified regions/parameters, where the controller continues to use the prior-provided region/parameter definitions for any unmodified/non-updated regions.

At block 425, the regulatory system provides, to each affected polygon/deployment, the corresponding updated spatial regions and wireless parameters, as discussed above. That is, the regulatory system may transmit the updated regions/parameters without an explicit or corresponding request or query from the deployment controller (e.g., based only on the prior registration). This can allow the regulatory system to transmit repeated updates whenever they occur without requiring a separate query for each action. For example, the regulatory system may transmit the updated regions only (refraining from transmitting or indicating the non-modified regions), or may transmit the entire set of relevant spatial regions for the deployment.

In this way, the regulatory system can provide efficient wireless spectrum management using spatial polygon registration to reduce consumption of bandwidth and other computational resources.

Figure 5:
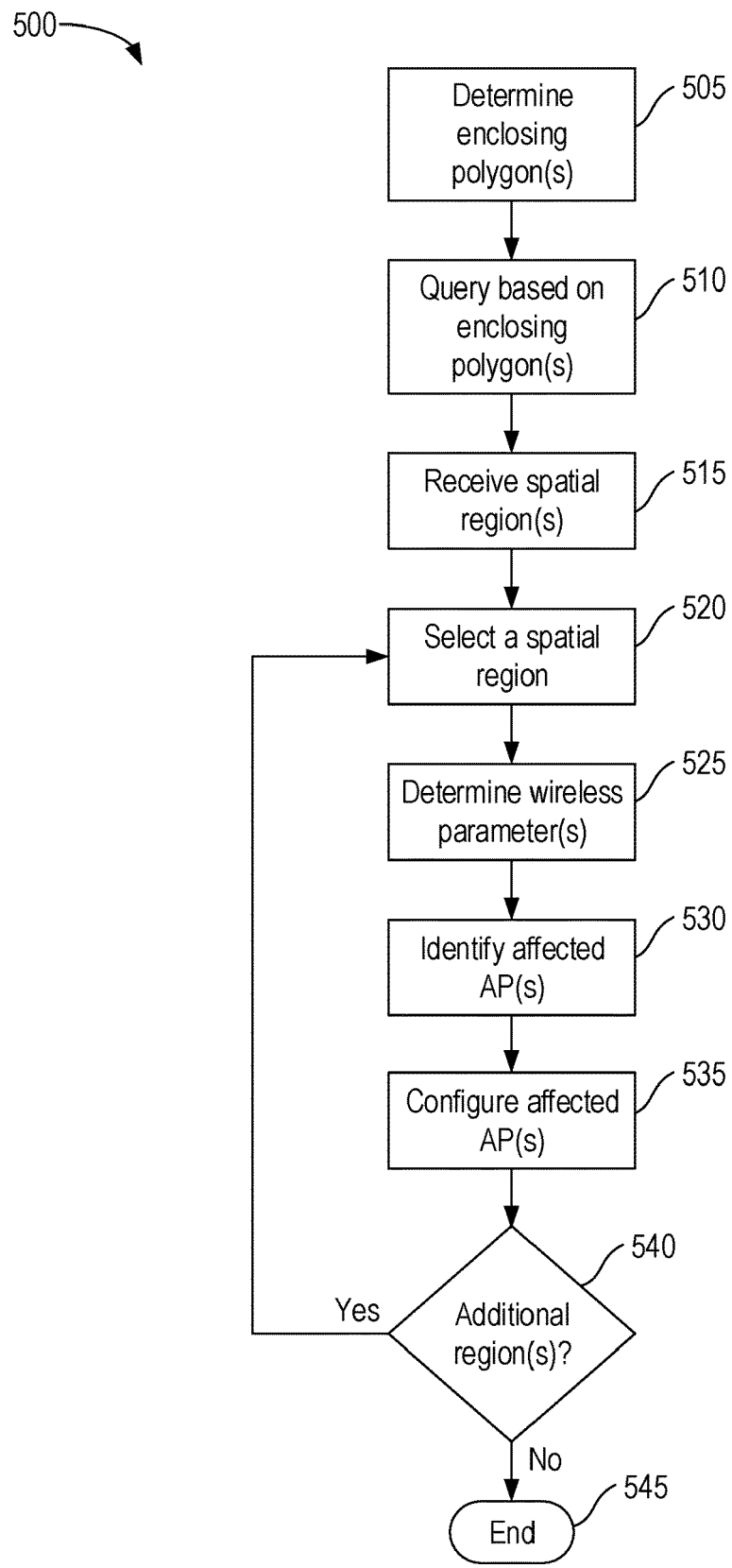
FIG. 5 is a flow diagram depicting an example method for improved frequency coordination via spatial queries, according to some embodiments of the present disclosure.

FIG. 5 is a flow diagram depicting an example method 500 for improved frequency coordination via spatial queries, according to some embodiments of the present disclosure. In some aspects, the method 500 is performed by a controller of a wireless network or deployment (e.g., a WLAN) and/or by a mediator, broker, or representative of one or more deployments, such as the wireless controller 120 of FIG. 1.

At block 505, the wireless controller determines one or more enclosing polygons for the wireless deployment that is managed by the controller (or for the deployments for which the wireless controller acts as a representative). As discussed above, the enclosing polygon(s) can generally include any shape/structure (e.g., rectangular prisms, spheres, convex hulls, and the like). Generally, the enclosing polygon(s) correspond to or indicate the location(s) of the AP(s) and/or the physical coverage area of the deployment(s) (e.g., in 2D or 3D space).

In some embodiments, the wireless controller generates the enclosing polygons based on (known) positions of the APs in the deployment and/or based on the wireless range of the AP(s). For example, the position of each AP may be manually configured or reported (e.g., by an administrator), or may be determined using other positioning methods (such as via one or more global navigation satellite systems (GNSSs).

At block 510, the wireless controller queries a regulatory system (e.g., the regulatory server 125 of FIG. 1) based on the enclosing polygon. For example, the wireless controller may transmit a query requesting information relating to any incumbent/licensed use of the RF spectrum within the polygon, and/or what wireless parameters are allowable within the polygon.

In some embodiments, as discussed above, the wireless controller may optionally include a registration request with the query. That is, in addition to requesting information relating to current restrictions, the wireless controller may further request that the regulatory system register or save the enclosing polygon(s) for future updates. In some embodiments, as discussed above, the wireless controller may additionally or alternatively provide the registration request as a separate transmission (distinct from the restriction query).

At block 515, the wireless controller receives, from the regulatory system, a set of spatial region(s) corresponding to the enclosing polygon. Although the illustrated example suggests reception of one or more spatial regions, in some embodiments, the wireless controller may receive an indication that no restrictions apply (e.g., if there are no incumbent users in the space).

At block 520, the wireless controller selects one of the spatial regions in the received set of spatial regions. Generally, the wireless controller can select the spatial region using any suitable criteria, as all of the regions in the received set will be evaluated during the method 500. Additionally, though the illustrated example depicts sequential evaluation of each spatial region separately, in some embodiments, the wireless controller may evaluate some or all of the regions in parallel.

At block 525, the wireless controller determines one or more wireless parameters associated with the selected spatial region, as indicated in the response provided by the regulatory system. As discussed above, this may include identifying the parameter(s) (e.g., frequencies) used by the incumbent user(s) in the spatial region, and/or the allowable wireless parameters that the wireless controller is allowed to use in the spatial region (e.g., without interfering with the incumbent use).

At block 530, the wireless controller identifies any APs in the wireless deployment (if any) that are affected by the selected spatial region. In at least one embodiment, as discussed above, the wireless controller can build and/or use a spatially-indexed deployment database that indicates the physical location and/or coverage area of each AP in the deployment. In one such embodiment, the wireless controller can search or query this deployment database using the selected spatial region to identify AP(s) included in the region and/or APs having a coverage area that overlaps partially or entirely with the selected region.

At block 535, the wireless controller configures each of the identified APs (identified at block 530) based on the determined wireless parameters (determined at block 525). For example, as discussed above, the wireless controller may configured the identified AP(s) (if any) to use the allowable channels or other portions/frequencies of the spectrum, to refrain from using the restricted or forbidden channels or other portions/frequencies of the spectrum, to use transmission power that is equal to or less than the indicated maximum, and the like.

At block 540, the wireless controller determines whether there is at least one additional spatial region in the received set of regions. If so, the method 500 returns to block 520. If not, the method 500 terminates at block 545.

In this way, the wireless controller can provide efficient wireless spectrum management using spatial polygon queries. Although not included in the illustrated example, in some embodiments, the wireless controller can additionally receive spatial region updates without transmitting a corresponding query. That is, if the wireless controller registered the polygon with the regulatory system, the wireless controller may receive updated regions/parameters whenever the regulatory database is updated without transmitting any further queries. In this way, in some embodiments, the wireless controller may transmit a single query (and/or updated queries whenever changes to the deployment are made) along with a registration request, rather than transmitting repeated queries (e.g., daily), as is performed in conventional systems.

Figure 6:
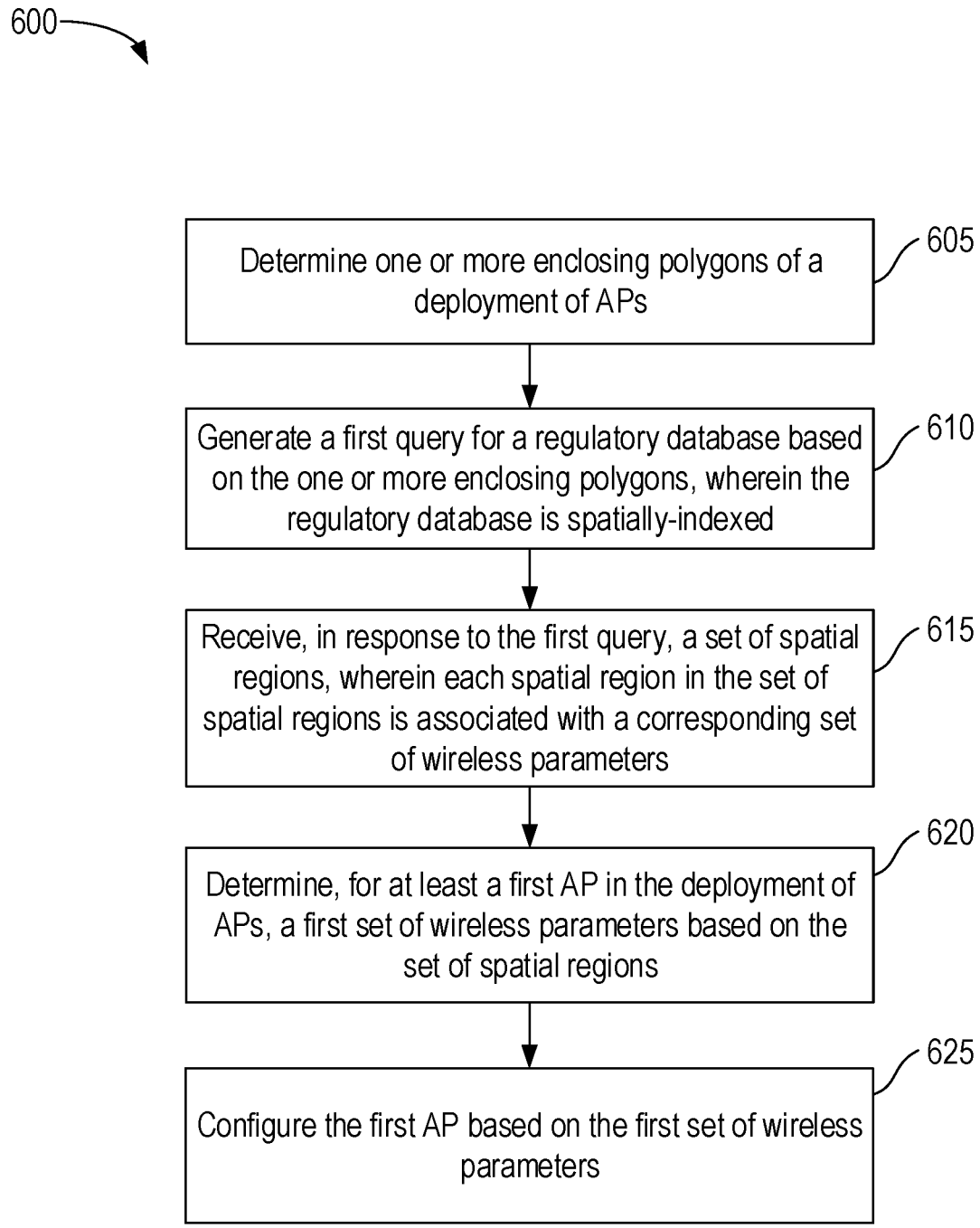
FIG. 6 is a flow diagram depicting an example method for frequency coordination based on enclosing polygons, according to some embodiments of the present disclosure.

FIG. 6 is a flow diagram depicting an example method 600 for frequency coordination based on enclosing polygons, according to some embodiments of the present disclosure. In some aspects, the method 600 is performed by a controller of a wireless network or deployment (e.g., a WLAN) and/or by a mediator, broker, or representative of one or more deployments, such as the wireless controller 120 of FIG. 1.

At block 605, one or more enclosing polygons (e.g., polygon 210 of FIG. 2) of a deployment of access points APs (e.g., APs 110 of FIG. 1) are determined.

At block 610, a first query for a regulatory database (e.g., provided by regulatory server 125 of FIG. 1) is generated, based on the one or more enclosing polygons, wherein the regulatory database is spatially-indexed.

At block 625, in response to the first query, a set of spatial regions (e.g., polygons 215 of FIG. 2) is received wherein each spatial region in the set of spatial regions is associated with a corresponding set of wireless parameters.

At block 630, a first set of wireless parameters is determined, for at least a first AP in the deployment of APs, based on the set of spatial regions.

At block 635, the first AP is configured based on the first set of wireless parameters.

Figure 7:
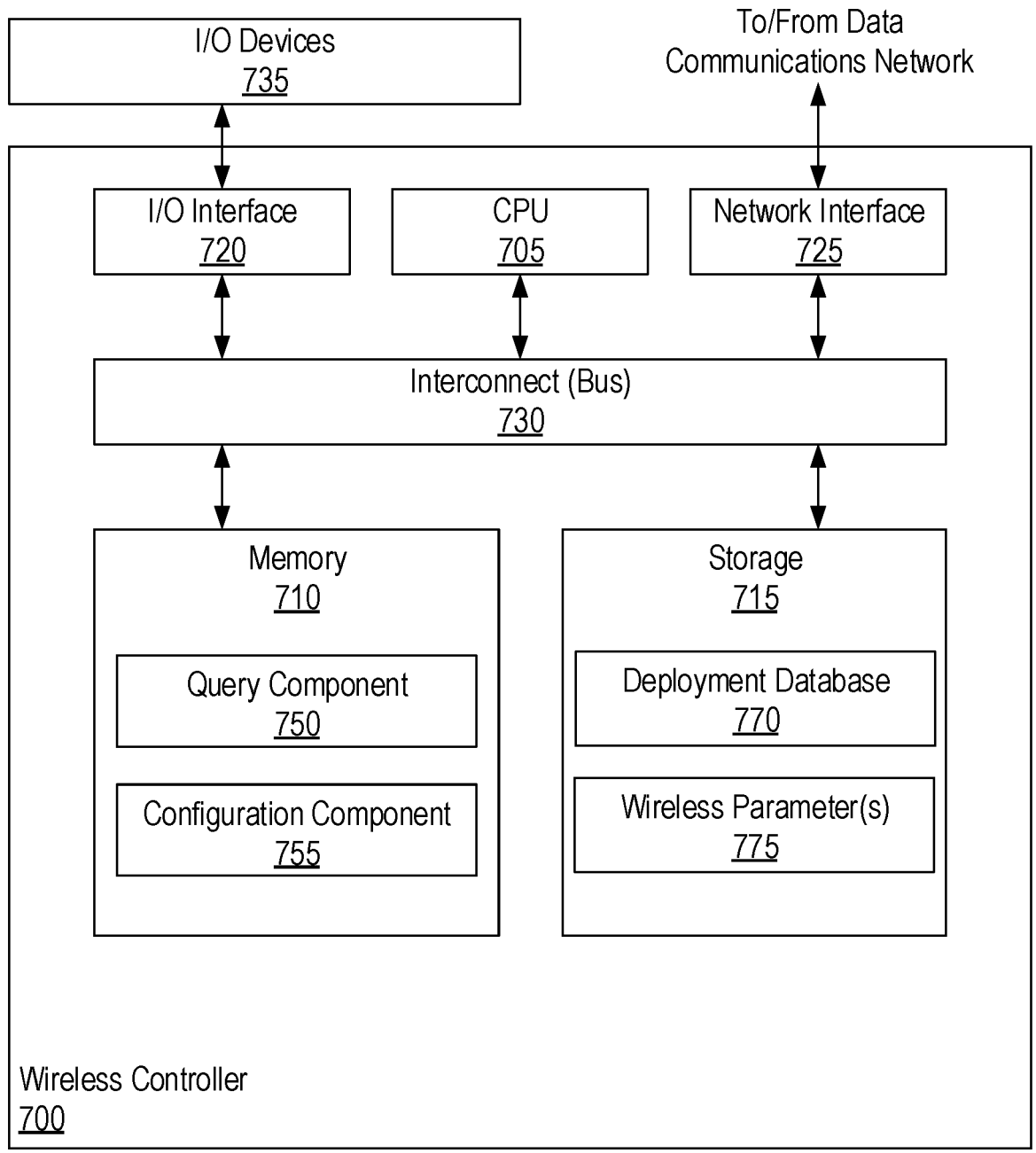
FIG. 7 depicts an example computing device configured to perform various aspects of the present disclosure, according to some embodiments of the present disclosure.

FIG. 7 depicts an example computing device (e.g., a wireless controller 700) configured to perform various aspects of the present disclosure, according to some embodiments of the present disclosure. Although depicted as a physical device, in embodiments, the wireless controller 700 may be implemented using virtual device(s), and/or across a number of devices (e.g., in a cloud environment). In one embodiment, the wireless controller 700 corresponds to the wireless controller 120 of FIG. 1. In some embodiments, the wireless controller 700 corresponds to a broker, mediator, or representative for one or more deployments/controllers.

As illustrated, the wireless controller 700 includes a CPU 705, memory 710, storage 715, a network interface 725, and one or more I/O interfaces 720. In the illustrated embodiment, the CPU 705 retrieves and executes programming instructions stored in memory 710, as well as stores and retrieves application data residing in storage 715. The CPU 705 is generally representative of a single CPU and/or GPU, multiple CPUs and/or GPUs, a single CPU and/or GPU having multiple processing cores, and the like. The memory 710 is generally included to be representative of a random access memory. Storage 715 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, I/O devices 735 (such as keyboards, monitors, etc.) are connected via the I/O interface(s) 720. Further, via the network interface 725, the wireless controller 700 can be communicatively coupled with one or more other devices and components (e.g., via a network, which may include the Internet, local network(s), and the like). As illustrated, the CPU 705, memory 710, storage 715, network interface(s) 725, and I/O interface(s) 720 are communicatively coupled by one or more buses 730.

In the illustrated embodiment, the memory 710 includes a query component 750 and a configuration component 755, which may perform one or more embodiments discussed above. Although depicted as discrete components for conceptual clarity, in embodiments, the operations of the depicted components (and others not illustrated) may be combined or distributed across any number of components. Further, although depicted as software residing in memory 710, in embodiments, the operations of the depicted components (and others not illustrated) may be implemented using hardware, software, or a combination of hardware and software.

In one embodiment, the query component 750 may be used to determine or generate enclosing polygons for wireless deployments, as well as to generate and transmit queries and/or registration requests based on such polygons, as discussed above. For example, the query component 750 may generate the enclosing polygon based on known or determined AP positions and/or coverage areas (or aggregate such polygons for multiple deployments), and transmit a query including the polygon to a regulatory system (e.g., the regulatory server 125 of FIG. 1).

Generally, the configuration component 755 may be used to configure APs in the deployment based on the restriction(s) indicated by the regulatory system, as discussed above. For example, the configuration component 755 may evaluate the received set of spatial regions to identify, for each such region, the affected AP(s) (if any). The configuration component 755 may then configure (or reconfigure) these affected APs based on the corresponding restrictions or allowable parameters, as discussed above.

In the illustrated example, the storage 715 includes a deployment database 770 and one or more wireless parameters 775. In some embodiments, the deployment database 770 corresponds to a spatially-indexed database indicating the position and/or coverage area of each AP in the deployment, as discussed above. The wireless parameters 775 generally correspond to the current configuration(s) of each AP in the deployment and/or the allowable configurations, as indicated in the response from the regulatory system. Although depicted as residing in storage 715, the deployment database 770 and wireless parameters 775 may be stored in any suitable location, including memory 710.

Figure 8:
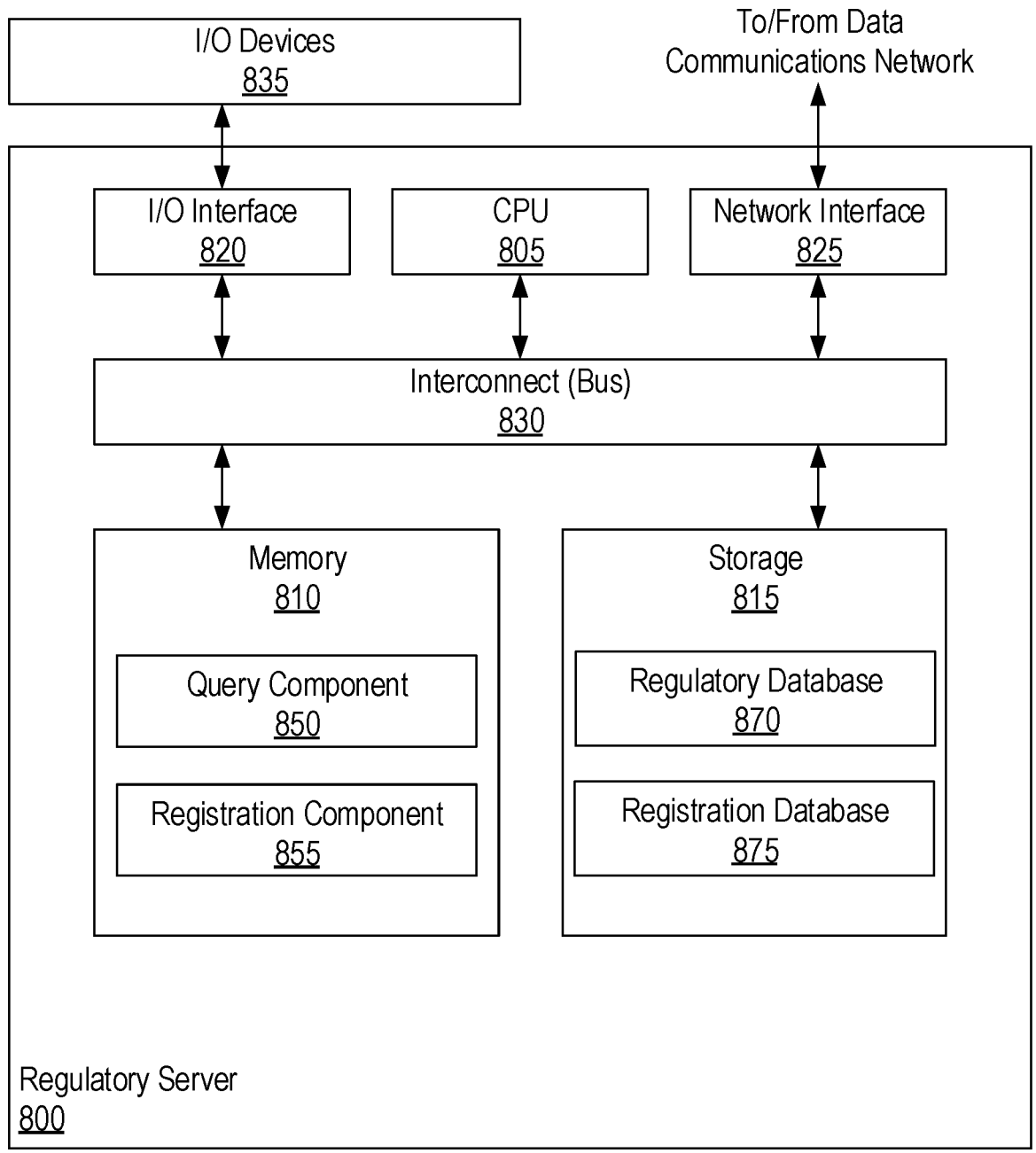
FIG. 8 depicts an example computing device configured to perform various aspects of the present disclosure, according to some embodiments of the present disclosure.

FIG. 8 depicts an example computing device (e.g., a regulatory server 800) configured to perform various aspects of the present disclosure, according to some embodiments of the present disclosure. Although depicted as a physical device, in embodiments, the regulatory server 800 may be implemented using virtual device(s), and/or across a number of devices (e.g., in a cloud environment). In one embodiment, the regulatory server 800 corresponds to the regulatory server 125 of FIG. 1.

As illustrated, the regulatory server 800 includes a CPU 805, memory 810, storage 815, a network interface 825, and one or more I/O interfaces 820. In the illustrated embodiment, the CPU 805 retrieves and executes programming instructions stored in memory 810, as well as stores and retrieves application data residing in storage 815. The CPU 805 is generally representative of a single CPU and/or GPU, multiple CPUs and/or GPUs, a single CPU and/or GPU having multiple processing cores, and the like. The memory 810 is generally included to be representative of a random access memory. Storage 815 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, I/O devices 835 (such as keyboards, monitors, etc.) are connected via the I/O interface(s) 820. Further, via the network interface 825, the regulatory server 800 can be communicatively coupled with one or more other devices and components (e.g., via a network, which may include the Internet, local network(s), and the like). As illustrated, the CPU 805, memory 810, storage 815, network interface(s) 825, and I/O interface(s) 820 are communicatively coupled by one or more buses 830.

In the illustrated embodiment, the memory 810 includes a query component 850 and a registration component 855, which may perform one or more embodiments discussed above. Although depicted as discrete components for conceptual clarity, in embodiments, the operations of the depicted components (and others not illustrated) may be combined or distributed across any number of components. Further, although depicted as software residing in memory 810, in embodiments, the operations of the depicted components (and others not illustrated) may be implemented using hardware, software, or a combination of hardware and software.

In one embodiment, the query component 850 may be used to evaluate spatial queries and generate responses, as discussed above. For example, the query component 850 may query a spatial regulatory database based on the enclosing polygon(s) included with the query to identify corresponding spatial regions, and determine the corresponding wireless parameter restrictions for each such spatial region. The query component 850 may then transmit the region(s) and parameter(s) back to the requesting entity.

Generally, the registration component 855 may be used to register polygons for automatic updating, as discussed above. For example, the registration component 855 may receive registration requests, and store the corresponding enclosing polygons in a registration data structure (e.g., a spatial database). Additionally, the registration component 855 may monitor the regulatory database for updates. When such updates are identified, the registration component 855 may identify any deployments (reflected in the registration database) that are affected by the update, and automatically provide updated spatial regions and/or parameters to these deployments.

In the illustrated example, the storage 815 includes a regulatory database 870 and a registration database 875. In some embodiments, the regulatory database 870 corresponds to a spatially-indexed database of spectrum restrictions (e.g., based on licensed use), as discussed above. The registration database 875 generally correspond to a data store (e.g., a spatially-indexed database) of registered polygons to be used for automatic updating, as discussed above. Although depicted as residing in storage 815, the regulatory database 870 and registration database 875 may be stored in any suitable location, including memory 810.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
    determining one or more enclosing polygons of a deployment comprising a plurality of access points (APs) based on, for each respective AP of the plurality of APs, a respective physical location of the respective AP;
    generating, by a wireless controller, a first query for a regulatory database based on the one or more enclosing polygons, wherein the regulatory database is spatially-indexed;
    receiving, in response to the first query, a set of spatial regions, wherein each spatial region in the set of spatial regions is associated with a corresponding set of wireless parameters;
    determining, for at least a first AP of the plurality of APs in the deployment, a first set of wireless parameters based on the set of spatial regions; and
    configuring the first AP based on the first set of wireless parameters.

2. The method of claim 1, wherein determining, for at least the first AP in the deployment of APs, the first set of wireless parameters based on the set of spatial regions comprises:
    generating a second query for a deployment database based on a first spatial region of the set of spatial regions, wherein the deployment database is spatially indexed; and
    determining, based on the second query, a set of APs, from the deployment of APs, corresponding to the first spatial region.

3. The method of claim 1, wherein the regulatory database comprises spatially-indexed records of incumbent wireless networks in one or more regions.

4. The method of claim 3, wherein the regulatory database is used to provide automated frequency coordination (AFC).

5. The method of claim 1, further comprising requesting registration of the one or more enclosing polygons with a regulatory service associated with the regulatory database.

6. The method of claim 5, further comprising receiving, in response to the registration, an updated set of spatial regions indicating updated wireless parameters.

7. The method of claim 6, wherein the updated set of spatial regions were provided to the wireless controller based on determining that the regulatory database was updated and without the wireless controller generating a second query for the regulatory database.

8. A non-transitory computer-readable medium containing computer program code that, when executed by operation of one or more computer processors, performs an operation comprising:
    determining one or more enclosing polygons of a deployment comprising a plurality of access points (APs) based on, for each respective AP of the plurality of APs, a respective physical location of the respective AP;
    generating, by a wireless controller, a first query for a regulatory database based on the one or more enclosing polygons, wherein the regulatory database is spatially-indexed;

receiving, in response to the first query, a set of spatial regions, wherein each spatial region in the set of spatial regions is associated with a corresponding set of wireless parameters;

determining, for at least a first AP of the plurality of APs in the deployment, a first set of wireless parameters based on the set of spatial regions; and configuring the first AP based on the first set of wireless parameters.

9. The non-transitory computer-readable medium of claim 8, wherein determining, for at least the first AP in the deployment of APs, the first set of wireless parameters based on the set of spatial regions comprises:

generating a second query for a deployment database based on a first spatial region of the set of spatial regions, wherein the deployment database is spatially indexed; and determining, based on the second query, a set of APs, from the deployment of APs, corresponding to the first spatial region.

10. The non-transitory computer-readable medium of claim 8, wherein the regulatory database comprises spatially-indexed records of incumbent wireless networks in one or more regions.

11. The non-transitory computer-readable medium of claim 10, wherein the regulatory database is used to provide automated frequency coordination (AFC).

12. The non-transitory computer-readable medium of claim 8, the operation further comprising requesting registration of the one or more enclosing polygons with a regulatory service associated with the regulatory database.

13. The non-transitory computer-readable medium of claim 12, the operation further comprising receiving, in response to the registration, an updated set of spatial regions indicating updated wireless parameters.

14. The non-transitory computer-readable medium of claim 13, wherein the updated set of spatial regions were provided to the wireless controller based on determining that the regulatory database was updated and without the wireless controller generating a second query for the regulatory database.

15. A system, comprising:
one or more computer processors; and
a memory containing a program which when executed by the one or more computer processors performs an operation, the operation comprising:

determining one or more enclosing polygons of a deployment comprising a plurality of access points (APs) based on, for each respective AP of the plurality of APs, a respective physical location of the respective AP;

generating, by a wireless controller, a first query for a regulatory database based on the one or more enclosing polygons, wherein the regulatory database is spatially-indexed;

receiving, in response to the first query, a set of spatial regions, wherein each spatial region in the set of spatial regions is associated with a corresponding set of wireless parameters;

determining, for at least a first AP of the plurality of APs in the deployment, a first set of wireless parameters based on the set of spatial regions; and configuring the first AP based on the first set of wireless parameters.

16. The system of claim 15, wherein determining, for at least the first AP in the deployment of APs, the first set of wireless parameters based on the set of spatial regions comprises:

generating a second query for a deployment database based on a first spatial region of the set of spatial regions, wherein the deployment database is spatially indexed; and determining, based on the second query, a set of APs, from the deployment of APs, corresponding to the first spatial region.

17. The system of claim 15, wherein the regulatory database comprises spatially-indexed records of incumbent wireless networks in one or more regions.

18. The system of claim 15, the operation further comprising requesting registration of the one or more enclosing polygons with a regulatory service associated with the regulatory database.

19. The system of claim 18, the operation further comprising receiving, in response to the registration, an updated set of spatial regions indicating updated wireless parameters.

20. The system of claim 19, wherein the updated set of spatial regions were provided to the wireless controller based on determining that the regulatory database was updated and without the wireless controller generating a second query for the regulatory database.

* * * * *